US005610839A

United States Patent [19]
Karolak et al.

[11] Patent Number: 5,610,839
[45] Date of Patent: Mar. 11, 1997

[54] COMMUNICATIONS MANAGEMENT SYSTEM ARCHITECTURE

[75] Inventors: Dale W. Karolak; Carl L. Shirey; Wesley D. Steiner; Robert T. Rue, all of Ft. Wayne, Ind.

[73] Assignee: ITT Corporation, New York, N.Y.

[21] Appl. No.: 320,499

[22] Filed: Oct. 7, 1994

[51] Int. Cl.$^6$ ................................................. G08C 17/00
[52] U.S. Cl. ............................ 364/514 C; 455/31.1; 455/33.1; 455/67.1; 375/202
[58] Field of Search ..................... 364/514 C; 370/17; 455/56.1, 34.1, 31.1, 33.1, 38.1, 67.1; 340/825.72

[56] References Cited

U.S. PATENT DOCUMENTS

| | | | |
|---|---|---|---|
| 4,334,322 | 6/1982 | Clark, III | 455/62 |
| 5,117,422 | 5/1992 | Hauptschein et al. | 370/95.1 |
| 5,404,403 | 4/1995 | Bright et al. | 380/21 |
| 5,425,051 | 6/1995 | Mahany | 375/202 |
| 5,451,839 | 9/1995 | Rappaport et al. | 375/224 |
| 5,455,821 | 10/1995 | Schaeffer et al. | 370/17 |
| 5,483,596 | 1/1996 | Rosenow et al. | 380/25 |

OTHER PUBLICATIONS

Communications Management Systems (CMS) Fill Device (CFD) Apr. 8, 1993, Ft. Wayne, Indiana.
Communications Management System (CMS) User's Manual Apr. 8, 1993, Ft. Wayne, Indiana.
Communications Management System (CMS) Overview of the Planning Process, Apr. 8, 1993, Ft. Wayne, Indiana.
Communications Management System (CMS) Functional Specification, Apr. 8, 1993 Ft. Wayne, Indiana.

*Primary Examiner*—Emanuel T. Voeltz
*Assistant Examiner*—Patrick J. Assouad
*Attorney, Agent, or Firm*—Plevy & Associates; Patrick M. Hogan

[57] ABSTRACT

A novel Communications Management System architecture (CMS) supports asset, frequency and key management functions in a multi-unit, multi-network communications system and automates the planning required for effectively carrying out tactical communications in such an environment. CMS matches the detailed frequency and key distribution required for radio networks supporting such an operation, and consolidates all of the information required to operate such a radio system into a single database. The CMS architecture provides a flexibility to allow for specialized key and frequency assignment generation, net communications planning, distribution planning of communication equipment, deployment planning and asset planning and generation of Communications Information (CI). The architecture provides an integrated approach that enables such communication planning/management functions to be tied together into a single software program to assure verification of data and eliminate duplication of effort.

23 Claims, 3 Drawing Sheets

Microfiche Appendix Included
(3 Microfiche, 215 Pages)

COMMUNICATIONS MANAGEMENT SYSTEM ARCHITECTURE

FIELD OF THE INVENTION

This invention relates generally to communications management systems for complex wireless communications arrangements, and more particularly to a system and method for an integration of a plurality of related such communications management functions under a common architecture.

CROSS REFERENCE TO RELATED MATERIALS

The herein disclosed invention has been substantially described in a series of internal specification documents prepared by the inventors for their employer, ITT Corporation, the assignee of this application. Those internal ITT specification documents, which are listed below, are incorporated herein by reference.

1) Communications Management System (CMS)—Functional Specification—ITT Defense and Electronics, Aerospace/Communications Division
2) Communications Management System (CMS)—Overview Of The Planning Process—ITT Defense and Electronics, Aerospace/Communications Division
3) Communications Management System (CMS)—Users Manual—ITT Defense and Electronics, Aerospace/Communications Division
4) Subsystem Functional Description For The Communications Management System (CMS)—Fill Device (CFD)—ITT Defense and Electronics, Aerospace/Communications Division None of the listed documents have been published or made available in any public forum.

MICROFICHE APPENDIX

A Microfiche Appendix is appended hereto containing a program listing for an illustrative software implementation of the Communications Management System of the invention. That Microfiche Appendix is comprised of 3 sheets of microfiche, containing a total of 215 frames.

BACKGROUND OF THE INVENTION

With the utility and flexibility provided by the current level of technological development in the art of wireless communications, there will often be circumstances where a large number of communicators, using such wireless technology, must be interfaced and managed. In a typical situation, those communicators would be arranged into a plurality of networks, of nets, according to some commonality of interest among members of a given net, and often such nets will be arranged in accordance with a predetermined hierarchy. A frequency plan will be developed for allocating transmission frequencies among the various nets in a manner intended to avoid interference among simultaneous transmissions. It will also frequently be the case that transmissions among such communicators are desirably encoded to avoid interception of the communicated intelligence by electronic "eavesdroppers". Thus a security plan may also be required governing the establishment and assignment of the codes used for such encoding. Because such codes may occasionally be broken or otherwise compromised, a facility must also exist in the communications management structure for periodically changing the codes in use by all, or some substantial portion of the communicators.

A typical environment requiring application of such communications management/planning methods would be a military exercise, where a large number of personnel and equipment would be deployed in a relatively small geographical area, and having a multiplicity of diverse communications requirements. Except as the context requires otherwise, such a military communications environment will be assumed hereafter as the underlying communications environment for the discussion to follow, both as to the current state of the communications management art and the novel communications management system of the invention. It will be apparent, however, to those skilled in the art that the system of the invention will also find ready application in the public safety environment, as well as in many industrial operations.

As background for illustrating the general communications management process in a complex communications environment such as described above, we will first describe the essential elements involved in the planning/management of such a communications system. In such an exemplar communications environment, the planning process would typically involve four major categories of such planning: (1) network planning, (2) frequency planning, (3) security planning, and (4) distribution planning. We will consider each of those planning categories in turn below.

I. Network Planning

The network planning function includes the collection of communications data generally related to the expected operating environment as well as data specific to an operations plan for the operation to be supported by such a communications system. Included in such data will be information on: (1) user requirements, (2) RF emitters alien to the communications system which are expected to be found in the planned operating environment, (3) communications gateways to related operations, and (3) unit location changes from a pre-planned system. Because the operations plan will generally be subject to change as it is further refined to accommodate actual conditions found in the operating environment, the communications plan must also be capable of change in response to new information in respect to the operating plan. In the typical case, communication requirements and user needs will flow from lower levels in a communications hierarchy up to higher levels in that hierarchy, where network planning is being performed. Such planning data may include information on units to be deployed and available radio equipment, netting requirements, deployment locations, and local frequency use.

Once a more-or-less complete set of data respecting communication requirements for the planned operation has been obtained, the communications planner will then assign radio users and equipment to nets. As will be appreciated, in the absence of some form of automation, this assignment process will involve manual, often error-prone activities typically using pencil and paper. For a system typical of the complexity to which the communications management system of our invention would be applied, several thousand radios arranged into several hundred nets are likely to be involved. Thus, it can readily be seen that the task of tracking each authorized user, the radio equipment assigned to each net, and the numbers of nets assigned would be a time-consuming burdensome process.

As a further step in the network planning process, analysis of terrain for propagation studies and line-of-sight analysis may be required for some or all of the mobile radio units involved in the communications system. In some cases, a retransmission site may be needed for placement of a relay station to extend the range of communication.

Inherently, changes in the operating and communication plans will continue to occur to accommodate anomalies which were not considered in the original plan. The network planning function must include sufficient flexibility to accommodate such continuing changes.

II. Frequency Planning

To enable efficient and optimal usage of the available radio frequency spectrum, a frequency plan must be developed. The frequency planning function involves three essentially distinct subfunctions: allocation, allotment, and assignment of frequencies.

Frequency allocation describes the portion of the RF spectrum that a country or region is lawfully permitted to use and will usually have been established by national and/or international agreement. That frequency allocation defines the primary, second, and permitted usage in each frequency band.

The frequency allotment for a particular environment would be derived from the frequency allocation for the country or region where that operation is being conducted. Normally, such a frequency allotment would be established pursuant to domestic policy for that state or region.

The assignment of frequencies for individual users and/or nets will be determined by the network planner, and will be derived from the frequency allotment for the operations area.

It will be readily understood that, through proper frequency planning, a number of desired objectives may be achieved. Such objectives include: (1) reduced interference and conflicts within the local RF spectrum, (2) increased optimization of spectrum resources, (3) increased number of useable communications channels, and (4) organization and tracking of assignments. Moreover, since the operating environment for a communications system of the complexity under consideration here is highly dynamic, it is important that the communications planner be able to modify and regenerate a frequency plan quickly and easily.

Another frequency-related task to be addressed by the communications planner is the avoidance of restricted frequencies within the frequency allotment for the operations area. In many cases, there will be restrictions on individual frequencies such that those individual frequencies are not available for use by the planned communications system. Typical of such restricted frequencies will be those used for commercial, radio and television, safety and emergency services, special use frequencies, and, where operating in hostile territory, known RF jammers. Such restricted and reserved frequencies would be removed from the allotment by the frequency planner, thereby yielding the useable allotment as the starting point for assigning frequencies for the communications system of the planned operation.

The communications planner must then consider the various transmission/reception modes to be supported by the communication system. In virtually all cases, a single channel ("SC") transmission/reception mode will be supported and will require the assignment of frequencies for such single channel operation. However, it will frequently be the case, particularly in the military environment, where a spread-spectrum transmission/reception mode will also be extensively used, with such spread-spectrum communications typically being of the frequency-hopping type. For such frequency-hopping ("FH") spread spectrum communications, frequency hopsets—i.e., the band of frequencies used by a particular FH net—and lockouts—frequencies which are prohibited from use by an FH net—must also be established by the communications planner.

When planning frequencies for the single channel mode, particularly as related to the HF band of frequencies typical for such single channel operation, the communications planner will select channels from the frequency allotment which are within the range of the recommended Lowest Useable Frequency ("LUF") and Maximum Useable Frequency ("MUF") for the band, preferably close to the Frequency of Optimum Transmission ("FOT"). These values must be determined by using current sunspot numbers and solar flux values.

Additionally, when designing single channel communications nets, the communications planner must consider cosite interference, such as harmonic and intermodulation interference. By using proper frequency and distance separation, the planner will be able to design a reliable communications net which largely avoids such interference.

In the case of the frequency-hopping transmission/reception mode, the frequency planning process begins by identifying the available allotment. It will usually be the case that frequency hopping transmitters will not interfere with single channel receivers as long as they are not collocated. However, there may be some single channel frequencies that are desirably removed from the frequencies in use by such a frequency hopping transmitter. After removal of such frequencies from the frequency allotment, the communications planner will precede to generate the hopsets and lockouts for the frequency-hopping nets.

As indicated above, FH lockouts define frequencies that must not be used in the frequency-hopping mode, while FH hopsets define the frequencies that can be used in a particular frequency-hopping net. In order to reduce the possible effects of jamming—one of the advantages of the frequency-hopping mode, the communications planner will also attempt to select frequencies spread across the allotment for the frequency-hopping mode. It will be appreciated that a manual creation and modification of hopsets and lockouts for a frequency-hopping radio is impractical and that automation should therefor be employed for this function.

Finally, it will be understood that the ability to establish and maintain communication within a given frequency band can vary greatly depending on many environment conditions, such as time of day, sunspot activity, terrain, etc., as well as the level of cosite and harmonic interference. Noteworthy as well, is the fact that the use of frequency-hopping radios places a greater demand on the amount of spectrum resources needed. All of these elements contribute to an increased level of analysis required of the communications planner in an effort to optimize the communications system being managed.

III. Security Planning

After a workable frequency plan has been developed by the communications planner, considerations of security for the communications exchanged within the communication system will be a logical next step. It is noted that the planning sequence of performing frequency planning prior to security planning will generally be reasonable since the need for re-planning at the network level is more likely to occur due to frequency conflicts than to changing security requirements.

As previously indicated, a security regime will often be desired to prevent interception of the communicated intelligence by third parties, particularly hostile third parties. Typically, such security is provided by an encoding-decoding scheme whereby the transmitted information is encoded using a code known to the authorized receivers, and decoded by those receivers. In the case of the frequency-hopping mode, such encoding will ordinarily by applied to the sequence of frequencies utilized for a particular frequency-hopping transmission. For single-channel mode, the transmitted signal, which generally will have been converted to digital form, will be modified in accordance with the selected code and the receiver will be adapted to remove the coding information from a received signal, thereby recovering the communicated intelligence. In many cases, the encoding scheme will utilize a form of cryptography, where the coding is determined from a "key" supplied to the user. Because such keys would ordinarily be provided as a series of variables—as a means for providing increased security against deciphering of the key, they are commonly designated as crypto-variables. For convenience we will hereafter refer to the electronic coding of data used by the transmitters/receivers of a communications system in terms of such crypto variables (or, alternatively, crypto-keys). It will be understood, however, that other forms of encoding for providing communications security for the net could as well be used consistent with the intent and purposes of our invention.

There will generally be two types of crypto-variables used in a communications system of the scope and type discussed herein. The first type will be used to provide encryption and decryption of message traffic on a communications link within the communications system, and will be designated herein as a Crypto-Variable ("CV"). The other type will be used to provide encryption and decryption of CVs during the process of downloading such CVs from a network-level source to individual transmitter/receivers within the network, and where such downloading is itself accomplished via a radio link, thus being subject to interception. This type will be designated as a Remote Crypto-Variable ("RCV"). As will be known, crypto-variable are identified electronically by a unique "Tag".

The communications planner must continuously be aware of changing requirements and the effects of those changes on the security plan. For example, a need may be identified for two members (i.e., users) in different nets to communicate. Through replanning at the network level the situation could be handled in one of two ways. Either those two members could be connected into a new net, or one of the members could be included in the existing net of the other member. The first approach would require additional communications parameter information (hereafter "Communications Information" or "CI"), including additional crypto-variables and possibly additional frequencies. The second approach generally uses existing CI.

In the absence of automation, the communications planner would typically be required to make a cross reference list such as the following:

Each member and its associated nets

Each net and its associated members.

To each net (and each net member), the planner must assign a crypto-variable tag. Continuous checking must be performed to avoid assigning more crypto-variable tags to a member than its transmitter/receiver can accommodate. Also the planner must be aware that policy or operating constraints may limit the number of members in a net. For each net member, the planner typically must provide a different Remote Crypto-Variable, in order to facilitate remote recovery from the circumstance of one member having been compromised—e.g., its CV having been learned or its transmitter/receiver equipment having been obtained by an alien interest. The concept of "recovery" from such a compromise, as used herein, generally relates to the loading of new security codes into the transmitter/receivers for the non-compromised users in a net.

It can thus be readily seen that there are a large number of crypto-variables (CVs and RCVs) which must be managed and tracked. For example, in a communications system comprising three hundred nets with an average of ten members per net, the number of CVs will be three hundred and the number of RCVs can be as high as three thousand.

Each communications plan will have a mission associated with it. Generally, within that mission, each crypto-variable must be changed or updated on a regular basis according to a pre-determined policy. Such changes are called crypto-variable supersession. Thus, the communications planner must also be aware of the usage period for each crypto-variable and must plan accordingly for the successive versions. Typically, the CVs and RCVs have different usage periods.

IV. Distribution Planning

Once the Communications Information (principally frequency and security data) for all of the members and nets comprising the communications system has been determined, that CI must be loaded into the transmitter/receivers of each of the members, a process referred to as "fill"—for filling (or loading) the CI data into the member transmitter/receivers. In a complex communications system, the large number of equipment assignments and the need to transport data and devices complicate the distribution of CI from a planning site.

Planning the distribution of the data generally consists of two parts:

Determination of Fill Paths (Connectivity)

Fill Routing

Fill connectivity analysis discovers what paths are available for this distribution. Fill routing assigns information along such paths.

To identify fill connectivity, the communications planner must analyze the resources available to hold and transfer fill data, including the data source, fill devices and destination radios. Then, an analysis is required to determine realistic distribution paths allowing for geographic separation, schedule differences, and organizational barriers. Travel or transmission time will also be considered in the analysis. Finally, the planner creates a connectivity "map" showing the potential paths between the data source and the destination radios.

Fill routing assigns the paths on such a connectivity map for each item of Communications Information to reach its intended destination radio. Several constraints will guide or limit the communications planner performing this routing. To begin with, fill devices have a finite capacity. And, for security reasons, they should not contain more information than needed to meet their delivery missions. The communications planner will create a distribution plan that routes the required Communications Information efficiently over the connectivity map allowing for the capacities and other constraints applicable to the devices involved. The planner will then break the plan into specific instructions for each field device operator.

V. Frequency and Security Data Distribution

After all of the network, frequency and crypto-variable planning has been performed, the resulting CI must be distributed to the proper communications equipment. As the net size increases, this task becomes very time consuming and error prone. The distribution must be organized so that all members of a given net receive the CI for that net in a timely fashion. As will be appreciated, this task is almost impossible to accomplish accurately without some form of automation.

The CI will initially be distributed throughout the networks of the communications system by using a set of fill devices. The distribution would ordinarily take the form of a hierarchical structure, where master fill devices are downloaded with CI from the planning system, and pass parts of such downloaded CI data to subsidiary fill devices at lower hierarchial levels. These subsidiary fill devices, in turn, may fill certain communications equipment and also pass part of their CI data to other fill devices, and so on down the defined hierarchy.

VI. Post-Distribution Planning/Management

Once the CI for an operational plan has been distributed, another phase of planning (or, more properly, replanning) is entered: the updating and management of the communications plan. During this phase, the communications planner must continuously respond to dynamic changes in the operating environment for the communications system.

As an example of such changes, the frequencies in use by the communications system may need to be modified to account for either non-hostile RF emitters, which arrived in the operations area subsequent to the initial frequency planning process, or the jamming of one or more of the initially selected frequencies by hostile interests. While certain remedial actions may be appropriate at the user level, such as increasing a transmitter's power level or switching to a different net, it will often be necessary for the frequency planner to take action, such as replanning the net frequencies, or coordinating frequency/time usage with the non-hostile emitters.

In some cases, because of environmental changes, such as weather, solar flux, etc., radio communication in the operations area will be degraded. In that circumstance replanning must be performed starting with an analysis of signal propagation under the various current conditions. Such analysis will result in a selection of a modified frequency allotment which is more optimized to the current environmental circumstance. New CI will then be generated for the affected communications nets to include such selected new frequencies.

Throughout an operational mission, changes can also occur in the net structure required to support various operations. Members, or groups of members, may be geographically relocated and/or attached to different operational units, and thus the netting requirements may change. Such changes will usually be addressed by providing the relocated members with the CI for the new nets with which they are now associated. In some cases, however, geographic considerations will require the use of different frequency allotments.

As noted previously, most, if not all, of the crypto-variables will be periodically superseded, requiring that the communications planner perform certain tasks prior to the expiration date of the crypto-variable. First, the expiration dates of all distributed crypto-variables must be tracked so that enough time is available to generate and distribute new supersession crypto-variables prior to the end of the usage period for existing crypto-variables. Then, the supersession crypto-variables must be generated, associated with appropriate key tags, and distributed to the end users. In the absence of automation, these task are so burdensome that there would be a tendency to stretch the usage period for crypto-variables, thereby potentially compromising security in the communications system.

A further major on-going task for the communications planner is the reestablishment of communications security in the event of a security breach of one or more units of the communications system. In general, a communications security breach can be defined as a loss or gap in planned protection against unauthorized communications. It will be understood that even a suspected loss must be corrected for continued confidence in the net security. Such a breach could arise through loss of hardware containing CI, or by loss of the CI itself.

If a security compromise occurs, the communications planner must identify the extent of the compromise and choose a strategy to restore protection to the compromised network, such as by invalidating the compromised equipment and/or changing the crypto-variables for all authorized users. The planner must then identify what CI needs to be changed, and generate appropriate replacement information. Delivering that new information may involve identifying new distribution paths, and then making the distribution. As with the initial distribution, the process may use fill devices which directly load the new CI into the transmitter/receivers to be modified, or it may be remotely loaded into transmitter/receivers not having ready access to such a fill device via a radio link protected by an RCV.

From the foregoing discussion of the planning and management process for a system addressed to the communications requirements of a complex operational scenario, it will be apparent that two desirable objects in respect to such communications system will be: (1) an automation of the various planning/management functions which must be carried on, and (2) an integration of such functions into a common structure or architecture. While a degree of automation for some of these functions has been achieved in the prior art, nothing comes close to an integrated automation of the full communications planning/management function.

For example, software has been developed (ITT Export Hopset/COMSEC Key Generator Software) to provide frequency hopset and security key generation for a specific spread spectrum radio set, but such software does not address network management, distribution/asset management or CI generation management. Neither does this prior art software take other cooperating nets into consideration nor is it able to address single channel communications equipment.

A U.S. Army system identified as "RBECS" operates to facilitate frequency and CI generation for U.S. Army SINCGARS radios but does not support net management, key generation and management, or distribution/asset management functions.

The U.S. Army "Net Planner" software allows for net planning, key tag generation and limited distribution/asset management functions, but does not support frequency generation and management, key generation, and CI generation and management functions.

A proprietary system of Crossbow Management Systems only operates with specialized hardware because it distributes planning and management functionally across multiple equipment platforms, and, as well, targets its management functions to specific equipment in the Crossbow family.

A software/hardware system designated as "ISYSCON" provides planning and management functions across multiple workstations networked together at a local planning sight and may be interfaced only with specific equipment in the U.S. Army ACUS, CNR, and ADDS systems.

While it might be possible to cobble together various of these prior-art approaches to achieve some form of automation for most of the planning/management functions described above, such an approach certainly would not represent an integrated approach to communications planning and management and would inevitably result in substantial duplication of functions among the various software and hardware systems so cobbled together. Moveover, such a combinatorial system would be limited to working with the least common denominator of the various different systems with which such prior-art approaches are designed to operate.

Accordingly, it is an object of this invention to provide a fully integrated and automated communications management system capable of addressing all of the communications management/planning functions described above, and being operable with essentially the full universe of communications equipment which might be expected to be used in such a communications system.

SUMMARY OF THE INVENTION

The Communications Management System architecture (CMS) supports asset, frequency and key management functions in a multi-unit, multi-network communications system and automates the planning that is required for effectively carrying out tactical communications in such an environment. CMS matches the detailed frequency and key distribution required for radio networks supporting such an operation, and consolidates all of the information required to operate such a radio system into a single database. This integration and automation of frequency and key management function avoids duplicate data bases, substantially compresses the communications planning time, and reduces the likelihood of common errors occurring which might prevent users of the system from communicating with one another. Thus, CMS facilitates an integrated approach for communications management, planning, operation, analysis, and reporting for a wide array of existing and future RF communication equipment.

The disclosed architecture provides a flexibility to allow for specialized key and frequency assignment generation, net communications planning, distribution planning of communication equipment, deployment planning and asset planning and CI generation. This architecture provides an integrated approach that ties such communication planning/management functions together into a single software program to assure verification of data and eliminate duplication of effort. The architecture incorporates a graphic and menu approach which allows for maximum ease of person-machine interfaces in the performance of the supported communications management functions and the effective use of reporting capabilities.

The CMS architecture is based on a series of planning/management functions distributed between a personal computer and a fill device. The five general functions provided by CMS are:

(a) Frequency/Hopset Assignment, Generation and Management
(b) Key Generation and Management
(c) Network Planning and Management
(d) Distribution/Asset Planning and Management
(e) CI Generation and Management

DETAILED DESCRIPTION OF ME INVENTION

Figure 1:
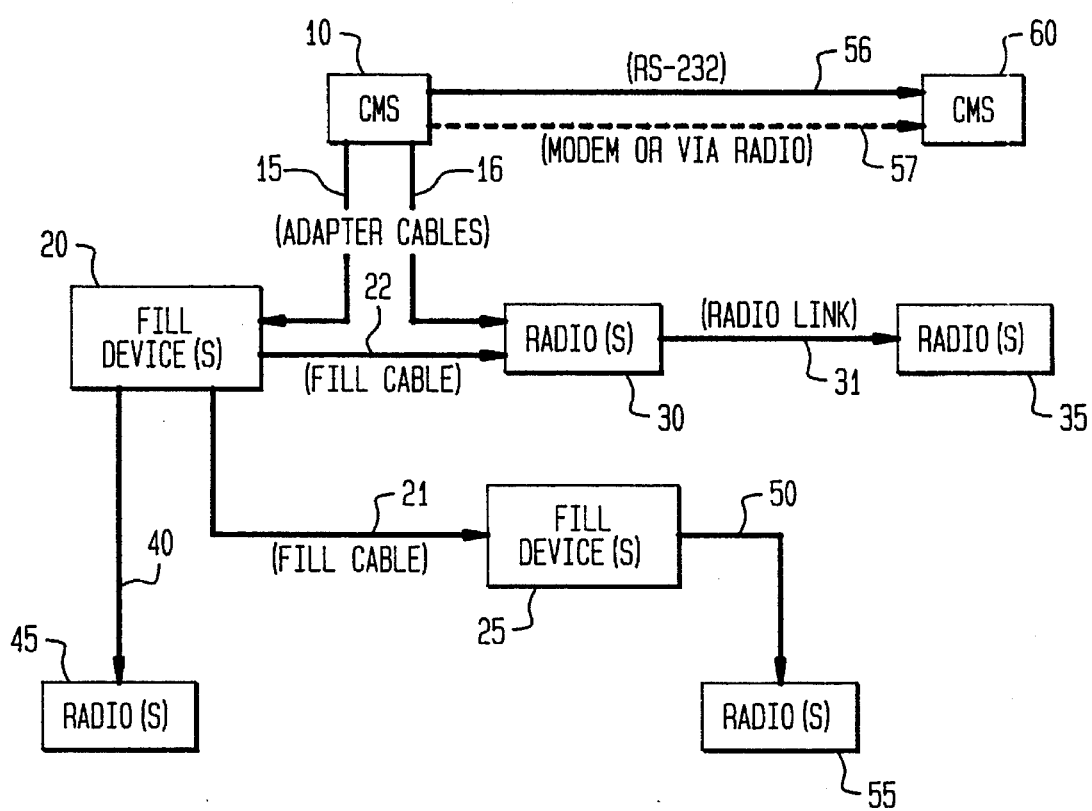
FIG. 1 shows an overview of the CMS operation.

The system of the invention, which we have designated Communications Management Systems (CMS), provides an architecture which can be readily implemented as a configurable software support package for network, frequency, key and distribution management functions in a multi-unit, multi-network communications system. The CMS architecture enables a communications planner to address all of the communications management/planning functions described in the Background section on a fully integrated and automated basis.

The overall operation of the CMS system in the planning and management of a complex communications system essentially parallels the management/planning hierarchy described in the Background section—i.e., net/asset planning is performed first, followed by frequency planning and then security key planning. The net structure and the equipment assets are entered into the CMS database from work sheets provided by cognizant communications personal having knowledge of the overall communications structure required for the particular operation to be undertaken. Typically, such worksheets would comprise net structure and asset information from subordinates of such communications personal which have been combined and forwarded upward through a chain of command. With CMS, a plurality of sample plans, or defaults, are provided which can be modified in accordance with the particular requirements for a specific operation, thereby significantly reducing the data entry requirements for net assets—e.g., radio transmitter/receivers (hereafter "radios"), fill devices and security devices.

Following net/assets definition, frequency planning is performed, starting with frequency allocations and allotments. A frequency allocation is generally static and is based on the geographical area. However, the frequencies which are allotted or assigned to users can change daily based on the planning performed by the CMS. In all cases, the frequency assignments are made from the frequencies allocated for use within a specific geographic area.

The allotted frequencies, as well as frequency restrictions applicable to the Communications Plan, are entered by the CMS operator, and conflicts between frequency use plans and frequency allotments for lower echelon user groupings may be eliminated. The allotted frequencies so developed are then used by CMS to generate and assign frequency hopsets (in the case of spread spectrum radios) and single channel frequencies for the single channel radios. Where radio nets are collocated, such that cosite interference appears likely, cosite interference analysis can also be done by the CMS as a further step in the frequency planning/allocation process.

Following frequency planning, security or crypto-key planning will be initiated. In the absence of the integrated and automated functionality of the CMS, the communications planner would typically have found it necessary to create the required crypto-nets (to support the operation's communications nets) using pencil and paper techniques to generate needed tables and cross-references for assuring interoperability. With CMS, the key tags and keys are automatically generated and assigned to the appropriate security equipment by CMS based on data stored in its database, thereby eliminating the manual, error-prone key-planning process as practiced under the prior art.

Following key and frequency planning, distribution of the communications parameters required for the proper functioning of each network and each radio comprising each such network—principally crypto-key information and assigned frequencies—is distributed under the management and control of the CMS. Such communications parameter data is designated herein as Communications Information, or "CI". Preferably, the CI will be distributed manually via fill devices, both in the initial loading of the radios for the nets comprising the system and for subsequent changes to the CI. Where required, however, CI may be distributed via a radio link using a second crypto-key to protect the security of such information.

As an overview of the CMS architecture, it provides an integrated, automated approach for efficiently planning the information required to establish communications for a complex operating environment. The CMS system provides a turnkey integration of network, frequency, key and distribution management functions into one system. Benefits of the CMS system include its flexibility, automation, and ability to reduce mission planning time and planning errors. The system provides an easy-to-use interactive planning environment, which incorporates, in a preferred embodiment, graphics for quick visualization of network structures.

A. Description of the preferred embodiment

In a preferred embodiment, the CMS system will be implemented as a computer-based software system that includes color graphics, a database, pop-up menus, and mouse control. Optionally, through use of the graphics capability of such a system, menus and text may be provided in character-based languages. The inventors have written a set of software for illustrating CMS architecture on a PC-based computer, and a program listing for that software is provided with this application as a Microfiche Appendix.

In FIG. 1, an overview of the CMS operation is presented. As will be seen, the CMS software and associated hardware 10 is connected via cables 15 and 16 to a fill device 20 (or a plurality of such fill devices operating at the designated hierarchal level) and to radio 30 (or a plurality of such radios operating at the same hierarchal level). Communications Information from the CMS is downloaded to the fill devices in the case where the radios which are to be loaded with the downloaded Communications Information are capable of being directly connected to such fill devices for the loading of such data. The path for such direct loading of data from a fill device to a radio is shown as cable 40 interconnecting fill device 20 with radio 45. Similarly, for radios at a lower hierarchal level which are capable of direct connection with a fill device, a subordinate loading arrangement is depicted as the path from fill device 20 via cable 21 to fill device 25 (which may be a plurality of such fill devices operating at a subordinate hierarchal level), and thence on to radio 55 (which may be a plurality of such radios operating at a subordinate hierarchal level) via cable 50. In the case where one or more radios to be loaded with Communications Information from the CMS is not susceptible to being directly connected with a fill device, a radio transmission of such Communications Information to the remotely located radio(s) is implemented, such as depicted in the path from the CMS via cable 16 to radio 30, thence via radio link 31 to remotely-located radio(s) 35. In using this radio transmission link, the Communications Information transferred from CMS to radio 30 will typically be encoded prior to transmission by radio 30, and, after reception of such encoded Communications Information by radio 35, that data is decoded and loaded into the remotely-located radio's Communications Information storage means.

In the event a CMS is required to be moved, or simply to support backup of the data stored in the CMS, the CMS data may be offloaded to an alternate CMS 60. As shown in FIG. 1, such offloading may be via a direct connection from the primary CMS 10 to the alternate CMS 60, such direct connection being depicted as an RS-232 serial cable 56, or may be via a modem or radio link 57.

Figure 2:
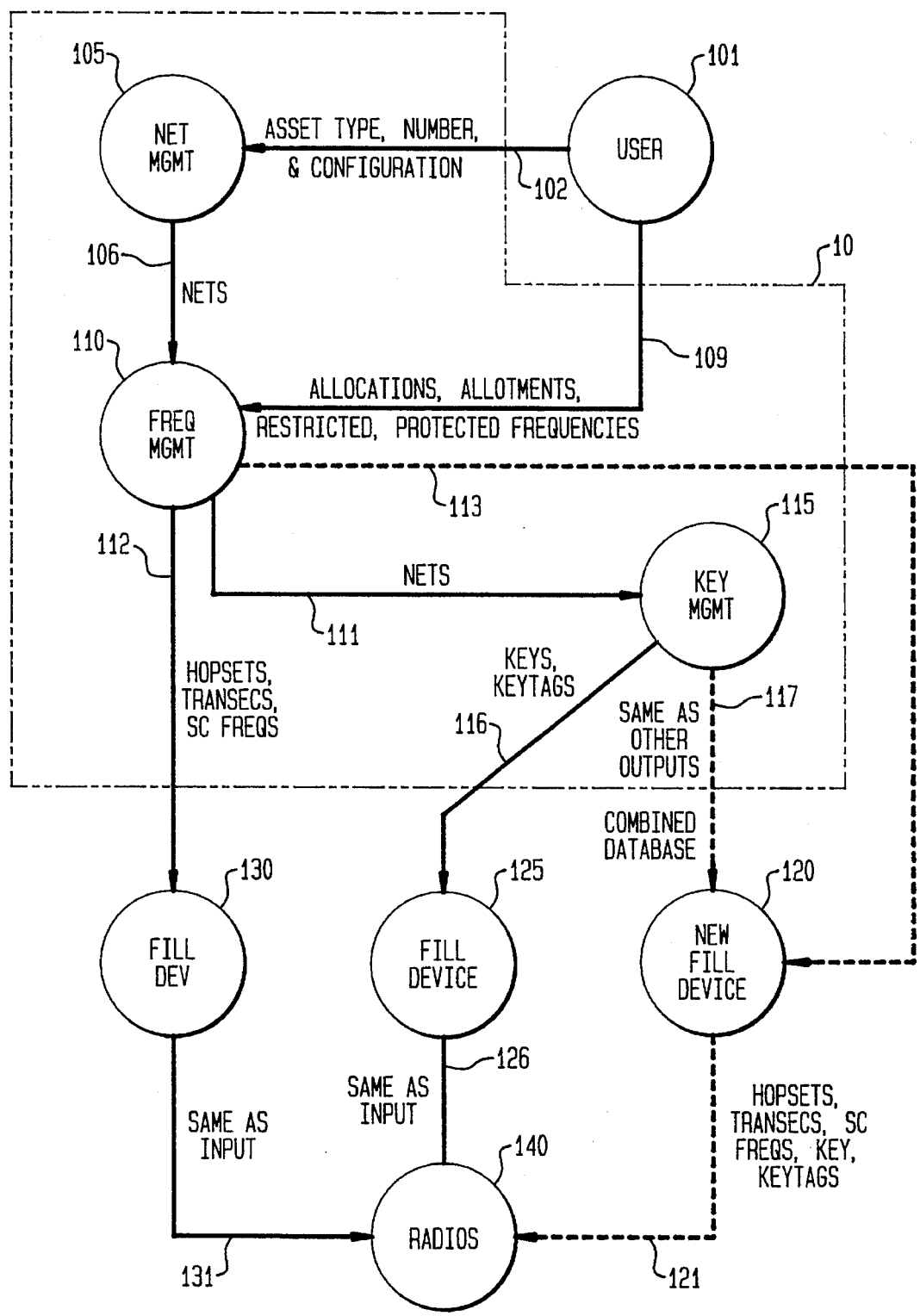
FIG. 2 shows the primary functional tasks carried out by the CMS.

A more detailed presentation showing the primary functional tasks carried out by the CMS is shown in FIG. 2. There, as will be seen, certain input data to the CMS is provided by a user 101. The overall CMS software/hardware, corresponding to 10 in FIG. 1, is shown within the solid line block designated 10. Among the user-supplied data is the asset type, number and configuration for the radios and fill devices used in the system under consideration. As shown in the figure, that data is provided by the user to the network management function of the CMS, designated 105, via connection 102. Another set of user supplied data, which is provided from the user to the frequency management function 110 of the CMS, is data related to frequency allocations, allotments, and restricted or protected frequencies. That data is shown as being provided to frequency management function 110 via connection 109.

As previously described, the network management function of the CMS would ordinarily be the first planning/management step undertaken by the CMS. After that function, depicted as 105 in FIG. 2, has been carried out, data representing the output of the network management function is transferred, via connection 106, to the frequency management function 110, where it may be utilized in carrying out the frequency management function, or may simply be stored while the frequency management function is underway. Upon completion of the frequency management function, output data representing the combined output of the frequency management and network management functions may be transferred directly to a fill device 130, via connection 112. Alternatively, in the case where a security key is required for the communications being managed by the CMS, that data would be transferred to a key management function 115 via line 111. Upon completion of the key management function, data representing an output of that function, along with network management and frequency management data from network management function 105 and frequency management function 110 would be transferred, via line 116, to fill device 125. The data stored in fill devices 125 and 130, which in combined form represent the Communications Information from the CMS, will then be loaded into radios 140. It will be understood from FIG. 1, that a multiple hierarchy of such fill devices and radios may be implemented, and that Communications Information from the CMS may also be loaded into remotely-located radios via a radio link, such as shown at 31 in FIG. 1.

Also shown in FIG. 2, as an alternative embodiment, is a combined database representing the network and frequency data from network management function 105 and frequency management function 110, transferred via dashed line 113, and the security data from key management function 115, transferred via dashed line 117, supplied to a single fill device 120. As with the first described embodiment, the output from fill device 120 would be provided to radios 140 via dashed line 121.

It will be appreciated from this brief description of the CMS system, that such a system will generally be used at higher echelons to plan and coordinate network parameters, frequency allotments, and key assignments. A primary advantage of the CMS system is that such key, frequency and network data can be distributed together, thereby avoiding redundant data entry, parallel distribution schemes, and duplication of fill devices.

Figure 3:
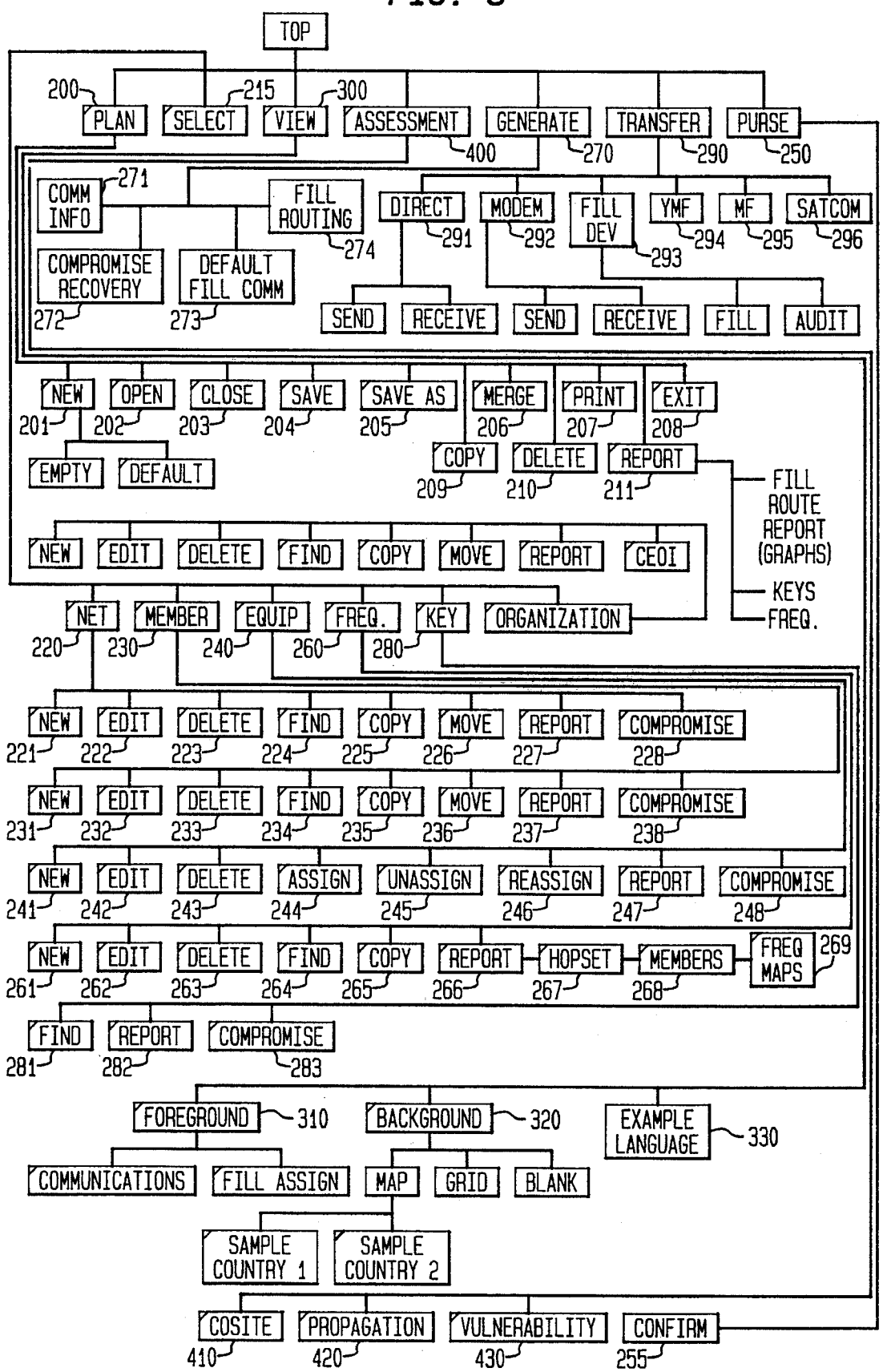
FIG. 3 depicts a typical menu architecture for the CMS system

The detailed arrangement and operation of the CMS system will be described and understood through the following discussion of the multiplicity of functions carried out by the CMS system. That discussion will also include, for purposes of example, reference to a typical menu architecture, as depicted in FIG. 3, representing the menu structure available to a communications planner using the CMS system. Unless a contrary form appears from the context, such references to the menu architecture of FIG. 3 will be of the form (Menu, n), where n indicates the relevant reference number from FIG. 3. The menu architecture of FIG. 3 is representative of an illustrative software embodiment of the CMS system, the program listing for which being attached as a Microfiche Appendix to this application.

As previously discussed, the overall functions of the CMS system are defined in terms of network, frequency, security key, and distribution management. In the CMS system, those functions are not only closely integrated but will ordinarily be highly automated. To illustrate the characteristics and ease-of-use for the various CMS sub-functions supporting the described overall functions, those sub-functions will hereafter be described in detail. The first five subfunctions—i.e., Plans, Nets, Members, Equipment, and Needlines—are addressed to the core elements of the communications planning process and the CMS functions with respect thereto. As will be seen, the remaining subfunctions are addressed to various operational characteristics of the CMS system.

A. Communication Plans

In ordinary circumstances, a plurality of base plans will have been established and be available to the communications planner, such base plans likely representing the communications infrastructure for different operational environments and/or objectives. In the context of this discussion, a communication plan will be understood to comprise all of the information which a communications planner must manage to meet a particular objective. The CMS permits the storage within its database of such a plurality of base plans, as well as other operational plans which may be under ongoing management by the CMS.

From that starting point, the CMS system offers the communications planner/operator a variety of options, many of which are depicted in the menu architecture of FIG. 3. In particular, the CMS system permits such an operator to call up any of that plurality of base line plans and modify such a plan so as to accommodate particular requirements for a given operational objective (Menu, 202). The CMS system also permits an operator to merge information from two existing plans into a new plan directed to such a particular operation (Menu, 206). The CMS system further offers an operator the opportunity to create an entirely new plan (Menu, 201), as well as to copy (Menu, 209) or delete (Menu, 210) an existing plan.

CMS offers the option of protecting plans with password (Menu, 201, 202) and allows the CMS operator to indicate the security classification for a plan. Such a security classification may be displayed on-screen at all times as well as being included on all hardcopy output. With CMS, data from a plan with a higher security classification cannot be copied, merged, or loaded into a plan with a lower security classification. The security classification for a plan can only be modified by an operator with the correct plan password.

Finally, CMS provides for the generation of reports respecting pertinent information about a plan (Menu, 211), which reports may be made available either on-screen or in hard copy.

B. Nets

As previously discussed, each communications plan will be expected to comprise a, or "nets". For purposes of this application, it will be understood that a net is a grouping of users having the capability to communicate with one another over an RF link. In order to facilitate intercommunication among the users comprising a net, the transmitter/receivers operated by each such user will all be loaded with common Communications Information—i.e., frequency and security key data.

With the CMS via the net subfunction (Menu, 220), a communications planner/operator will be able to modify existing nets (Menu, 222), create new nets (Menu, 221), make copies of (Menu, 225), or delete (Menu, 223), existing nets.

Power restrictions are maintained for nets by CMS, as applicable. And, net and frequency allotment power restriction relationships are maintained, as such restrictions may be applicable to the Communications Plan.

The CMS facilitates designation of, and contact with the Net Controller Station (NCS)—i.e., the designated communications command point for a net—for each net controlled and managed. The CMS also permits a communications planner/operator to select a portion of the communication plan, such as a particular net (Menu, 224), as the focal point for the CMS display—generally the center of such a display. Similarly, the CMS permits such an operator to change the position in the CMS display (Menu, 226) of a net and its associated elements, as an entity. In the case of a net being compromised, CMS provides recovery functions for the operator (Menu, 228). Finally, the CMS system offers a report generation capability (Menu, 227) as to pertinent information about one or more nets.

C. Members

Assemblages or groupings of equipment are termed members. Typically, members will correspond to users and will be part of one or more nets. With the CMS via the member subfunction (Menu, 230), a communications planner/operator is able to create new members (Menu, 231) or modify existing members (Menu, 232). The CMS system also enables the copying (Menu, 235) or deletion (Menu, 233) of existing members. Additionally, an operator using the CMS is able to display a member at an operator-selected position on the CMS display screen (Menu, 234) or to move a member from a previously selected screen position (Menu, 236).

Default member types are provided to the operator for asset planning and each member type has a corresponding equipment default. Members may be maintained in a force structure and/or in a tasking structure.

In the case of a member being compromised, CMS identifies all linked members in the relevant net and provides recovery functions for the operator (Menu, 238). Finally, report generation as to pertinent information about a member is enabled by the CMS (Menu, 237).

D. Equipment

The term equipment refers to radio sets and fill devices used with the communications plan managed by CMS. With the CMS via the equipment subfunction (Menu, 240), an operator is able to cream new equipment (Menu, 241), to delete equipment (Menu, 243), to assign (Menu, 244) or unassign (Menu, 245) equipment to or from a member, or to modify equipment information (Menu, 242). The CMS operator is also able to move equipment from one member to another (Menu, 246).

In the case of equipment being compromised, CMS identifies all linked equipment in the relevant net and provides recovery functions for the operator (Menu, 248). And, report generation as to pertinent information about equipment comprising the communications plan is provided by CMS (Menu, 247)

E. Needlines

A needline is a graphical representation of a line of communication between two net members. As will be understood, needlines within the same net share common Communications Information. With CMS, needlines are automatically generated from the Net Control Station to each net member. Thus, with CMS, an operator may establish needlines by assigning members and equipment to a net, or may remove needlines by unassigning members and equipment from a net. Report generation as to pertinent information about needlines is available from the CMS.

F. Purge

With CMS, a communications planner/operator is able to quickly delete all of the information in the current database, an operation designated as "purge" (Menu, 250). Such a purge operation may be required in the event of a security breach or an imminent compromise of the CMS system and/or equipment. With the purge operation, the operator is able to delete all sensitive information in the current database. Unlike other "delete" operations which may be carried out by the CMS, and which may be reversed, the purge process is not reversible. Because of this non-interruptability, and to avoid an accidental purge, the purge process will only be initiated after a confirmation response from the operator. To enable maximum flexibility in using the purge operation, that process is readily available from any screen or menu within the CMS.

G. Frequency Allotments

As noted previously, frequency allocations are bands designated, on a national or international level, for use by specific radio services. An allocation is used in CMS to check and bound frequency allotments to ensure compliance with national and international standards. Frequency allocations are optionally password protected. Frequency allotments are derived from frequency allocations and represent the group of frequencies established or allowed to be used by the communications planner/operator for a particular communications purpose. Frequencies which are included within an allocation but prohibited from inclusion in an allotment are designated as restricted frequencies.

With the CMS via the frequency allotment subfunction (Menu, 260), an operator is able to create new allotments (Menu, 261), to delete existing allotments (Menu, 263), to make copies of existing allotments (Menu, 265), and to modify existing allotments (Menu, 262).

CMS enables an operator to combine two or more existing allotments or restrictions, to find the common frequencies between two existing allotments or restrictions, and to find the frequencies that are not common between two existing allotments or restrictions (Menu, 264). The CMS operator will be able to "reverse-engineer" an existing hopset/lockout (presumably uploaded from a fill device) in order to obtain a frequency allotment. CMS maintains a hierarchical relationship between allotments and restrictions and maintains power restrictions on frequency allotments or frequency restrictions.

The CMS operator is also able to name allotments, and the system provides a report generation capability as to pertinent information about an allotment (Menu, 266).

H. Hopsets and Lockouts

A hopset is the frequency information used by a spread spectrum radio set to indicate which frequencies are available for a frequency hopping operation by that radio. The CMS will automatically generate hopsets for the Equipment comprising the communications plan based on operator selections, restrictions, and allotments (Menu, 271).

With a frequency-hopping spread-spectrum radio operation, certain frequencies within the hopset band for a radio may be unavailable for one reason or another. Data respecting such unavailable frequencies are designated as lockouts. In the course of generating Communications Information data for a spread-spectrum radio set, such lockout data will be incorporated in that CI in order to prevent the radio set into which such data is loaded from using such locked-out frequencies in its frequency hopping operation. The CMS automatically generates those frequency lockouts, as required during hopset generation, including universal lockouts as may be applied to all hopsets.

CMS allows the operator to indicate specific frequencies in hopsets or lockouts. The CMS also provides a report generation capability as to pertinent information about hopsets and lockouts (Menu, 267).

J. Communications Information Relationships

As will be understood, all members of a given net will generally receive the same CI to facilitate communications among such members. The CMS automatically maintains correct relationships between net members and the required CI elements for those members (Menu, 271). CMS also permits the operator to manually override automatically planned relationships between net members and their required CI elements.

As an operator option, the CMS will also automatically reduce the number of available frequencies in a hopset to avoid or lessen the need for lockouts within such a hopset. And, the CMS system provides a reporting capability as to pertinent information about CI relationships.

K. Net IDs

Net IDs identify both a particular hopset (generally, by the first, most-significant digit) and a particular hopping sequence (generally, by a second and third digit) within that hopset. The CMS system automatically generates and assigns those Net Iris, but also permits the operator to manually enter new or override automatically planned Net IDs. CMS provides a reporting capability to provide pertinent information about such net IDs.

L. Cue Frequencies

A Cue Frequency is a single channel frequency loaded into a radio's CUE channel, and will generally be available to all members of a communications net. Because the CUE channel will generally be unsecured, it will be primarily used for administrative traffic. The CMS system operates to automatically generate and assign CUE frequencies, but also permits the operator to manually enter new or override automatically planned Cue frequencies. CMS provides a reporting capability to provide pertinent information about such CUE frequencies.

M. Security Keys/Tags

As will be understood, keys are used to encrypt and decrypt voice or data. A tag is paired with each key to identify the key. It is to be noted that the terms "crypto-variable", "crypto-key", and "key" are generally interchangeable. The CMS operates to automatically create and assign keys and tags for all members of the communications plan (Menu, 271, 280). The operator may create a key tag and CMS will automatically generate a corresponding key.

The operator may enter new or modify automatically-generated key tag information, delete key/tag pairs, and assign or re-assign existing key/tag pairs (Menu, 281). CMS does not delete operator-created and operator-assigned key/tag pairs during automatic generation and assignment.

CMS automatically maintains supersession keys for keys/tag pairs and provides key/tag expiration reports (Menu, 282). CMS maintains other key variable information, such as CV seeds. And CMS also provides a reporting capability as to pertinent information about security keys/tags.

In the case of a key being compromised, CMS identifies all affected nets, members and equipment, and provides recovery functions for the operator (Menu, 283).

CMS also permits the operator to manually plan other electronic countermeasure variables. These include random-net bandwidths, lockout bandwidths, Common Security Codes (CSC), and Unique Security Codes (USC).

N. Checks

Checks are performed at appropriate times during the communications planning process to assure that various physical and/or policy constraints have not been violated. Among the checks provided by the CMS system are a verification as to needlines/equipment compatibility and verification that connected needlines do not exceed an equipment's capacity. Prior to distribution of the Communications Information, CMS also verifies that no assignments are still required. And, CMS ensures that deletion of distributed data within a plan does not occur without warning and confirmation.

O. Analysis/Data

As an operator option, the CMS system checks for potential cosite interference at any member, or at any two closely-located members. CMS will also provide an enhanced cosite analysis by predicting interference at any member or at any two closely-located members. A go-no-go recommendation is provided.

CMS will perform first-order link analysis by estimating the quality of the radio link taking into consideration general terrain characteristics, distance, and RT configuration where these parameters are derived from operator inputs. A go/no-go recommendation is provided. Such link analysis also permits the operator to change various parameters, such as those described above in order to determine trade-offs.

CMS facilitates maintenance by the operator of other types of data such as: callsigns; signs/countersigns; suffixes/expanders; and time periods.

P. Audit Trail

Audit trails provide feedback to CMS that distribution of the CI occurred as planned. This feature utilizes programmable fall devices which can track transfer of CI to equipment and report this information to CMS. CMS automatically associates uploaded audit data with the appropriate plan. CMS provides reports detailing planned and unplanned transfer of CI. And, audit trail information is coordinated with compromise recovery and reconfiguration operations.

Q. Fill Device Relationships

As previously discussed, the Communications Information for the communications plan is generally distributed to members via fall devices. The Communications Information will initialing be transferred from the CMS to one or more fall devices, with the fill-device to CMS transfer planning being automatically performed by the CMS system. Then the fill device to member distribution planning is performed by CMS. An operator may also manually override the CMS automatic fall distribution to indicate which members are to be filled by which fill devices, with automation and checking being performed as appropriate. CMS automatically downloads enough plan information to allow programmable fill devices to instruct the operator during CI distribution to members.

The Communications Information may need to be transferred from a higher-order to a lower-order fall device in order to ultimately fill the equipment of members of the communications plan. Such fill-device to fill-device transfer planning is performed automatically by the CMS. With that system, the operator is also provided an option to manually indicate which fall device is to receive data from other fall devices, subject to performance of a process of automation and checking as appropriate. Here also, CMS automatically downloads enough plan information to allow programmable fill devices to instruct the operator during transfer to other fill devices.

R. Communication Selections

In order to allow either communications plans or Communication Information to be transferred from a CMS system to another CMS system, a fill device, or a radio, a transfer mode must be determined and selected (Menu, 290). The CMS system permits the operator to select such a transfer mode—e.g., direct cable link (Menu, 291), modem link (Menu, 292), or radio link (Menu, 294, 295, 296), and automates the transfer process, including selection of ports in the operating platform to be used for such transfers. Both data downloads—i.e., transfer of data from the CMS system to another device, and data uploads—i.e., data transfer from another device to the CMS system, are supported by the CMS system transfer function.

S. Compromise Processing

Distributed Communications Information may be inadvertently lost for a number of reasons or may be obtained by hostile interests. In these cases, the Communications Information is compromised. The CMS system automates the process of recovery from a compromise of communications information (Menu, 272). Specifically, the CMS system allows an operator to identify the nature of a compromise—e.g., whether the compromise is in respect to a member, equipment, or CI element, and the system then automatically generates a plan for recovery from the compromise.

T. User Interface

To maximize usability the CMS provides an easy-to-use interactive planning environment, which incorporates graphics for quick visualization of network structures (Menu, 300). The system will include color graphics, pop-up menus (as illustrated in FIG. 3), and mouse control. CMS has the capability to display geographical data (as a background for the displayed network and related communications parameters) including map graphics and terrain elevations ("MG/TE"). CMS can provide to-scale network diagrams on selectable MG/TE background displays. These include member locations and/or network area coverage (net members "envelope").

CMS provides the capability to continuously display cursor coordinates in the coordinate system used by the MG/TE data. CMS provides the capability to compute and display azimuth and distance between two interactively chosen points.

CMS allows the operator to maintain scheduled changes to the plan, and provides the capability to maintain contingency plans associated with the current plan.

U. HF Management Options

CMS allows the operator to plan and distribute the HF channel data consisting of 1 to 99 channels and their corresponding frequencies. CMS allows the operator to plan and distribute key Automatic Link Establishment (ALE) parameters. This includes channel groupings, self/individual addresses and maximum channel scan. CMS allows the operator to plan and distribute key frequency hopping parameters. This includes exclusion frequency bands, nets, net IDs, hoptypes, hopsets, and hoplists.

CMS allows the planned HF CI to be downloaded to the HF radio via an ASCII file using an RS-232 interface. CMS also allows the planned HF CI to be downloaded to the HF fill gun via an ASCII file using an RS-232 interface.

EXAMPLE OF SYSTEM IMPLEMENTATION

In order to illustrate the establishment and management of a communications plan using the CMS, the following example, in the context of a military application, describes the functioning and operation of the system in a step-by-step fashion.

This planning example considers two vehicle Brigades with combined totals of approximately 2900 VHF (frequency-hopping) radios with 200 nets and approximately 400 HF radios with 50 nets. Because of the dispersed nature of the assumed mission and its area of responsibility, this example assumes that each of these Brigades has been placed in a primarily stand-alone planning mode.

For this example, the following numbers of unique nets are assumed. This does not imply that these are the only nets required at each command level. At each level, nets are common with adjacent and higher/lower units. Command levels with zero nets indicates that these units share nets with the higher command levels.

|        |                 | VHF    |      | HF     |      |
|--------|-----------------|--------|------|--------|------|
|        |                 | RADIOS | NETS | RADIOS | NETS |
| (2)    | Brigades (Bde)  | 20     | 5    | 10     | 5    |
| (10)   | Battalions (Btn)| 100    | 10   | 25     | 10   |
| (50)   | Companies (Co)  | 250    | 60   | 125    | 40   |
| (250)  | Platoons (Plt)  | 500    | 125  | 250    | 0    |
| (1000) | Squads (Sqd)    | 2000   | 0    | 0      | 0    |
|        |                 | 2870   | 200  | 410    | 55   |

The nets generally fall into the following three categories:
Command-Control (C2)
Administrative/Logistics
Intelligence Additionally, the C2 networks can be categorized into the functional areas of maneuver, fire support, aviation, Air Defense Artillery (ADA), and engineers. These areas establish their own internal C2 networks.

Typical VHF nets established at the brigade levels include the Command Operations (CMD OP) nets, intelligence (INTEL) nets, Rear Operations (REAR OP) nets, and administration/logistics nets as required. The VHF nets are the primary means of communications for short range (less than 35 KM) secure voice at Brigade and below.

The HF nets are similar to the VHF nets in function and many serve as backup nets to the corresponding VHF-FM nets. The HF radios (in a high power mode) can be used for voice nets that provide medium- to long-range communications (50 to 297 km). The primary use for the low-power mode is short-range (to 50 km). Typically, HF nets are established when the dispersal of forces is greater than the planning range for VHF nets.

Each net has a Net Control Station (NCS) or Net Controller. Each Net Controller at Company command level and above has a programmable fill device and is responsible for filling the radios at his command level and below. This is initially performed for all the Communications Information or "CI" at cold-start while in garrison and, later, for that CI which doctrinally must be distributed only by fill device when updated. Typically, in other cases, the Net Controller makes use of the radio features for sending hopping information via Electronic Remote Fill (ERF) and traffic crypto-variables (CVs) via Manual Remote Over the Air Load (MROAL).

Assumptions used for the planning example are summarized as follows:

The CMS terminal is stationed at the operational control facility for each Brigade and is staffed by officers familiar with Battlefield Spectrum Management (BSM) and Crypto-variable engineering. These operators are the communications planners for CMS.

A backup or alternate terminal is also stationed at the operational facility, to be used in case of hardware platform problems or if an adjacent Brigade's planning facility must move. In this case, if database backups for the primary facility are available, the alternate terminal at the adjacent Brigade can be brought online with the primary facility's database to provide a measure of continuity while that planning facility relocates.

Frequent database backups are made both for internal data protection and for passing to an adjacent planning facility and to the facility at the Division level. In this way, if the planning facility cannot continue operating for any reason, the data is available elsewhere for continuity of operations.

The following section describes the general activities at the planning facility, including use of the CMS terminal in support of these activities.

| PHASE/ACTIVITIES | CMS OPERATION |
|---|---|
| IMPENDING MISSION ALERT RECEIVED | |
| ● Coordination between CMS planner and signal officers | The CMS operator updates the reference plan as information is provided. This includes newly attached units anticipated for the mission along with radio requirements and net connectivity. |
| ● Develop friendly force laydown on maps as information is gathered | |
| ● Gather preliminary frequency information from Division (Div) CMS | The Div CMS provides a reference plan with the frequency allocation. The Brigade (Bde) CMS operator merges this information with the reference plan currently being developed. |

-continued

| PHASE/ACTIVITIES | CMS OPERATION |
|---|---|
| FORMAL OPERATIONS ORDER RECEIVED | |
| ● Gather information from signal officers (operations facility requirements including gateway requirements) | Certain aspects of the mission are now more fully defined. The communications requirements of the planning facility have been finalized and entered into the CMS reference plan. The facility in this example is identified as a member with four VHF radios and 2 HF radios. Initial net connectivity is also planned. Since this is a stand-alone operation, no gateway requirements are necessary at this time. A preliminary frequency restrictions for the immediate region of the planning facility is entered based on predicted and measured spectrum usage. |
| ● Track friendly force data as received and overlay on map backgrounds | |
| UPDATED SPECTRUM MANAGEMENT DATA ACQUIRED | |
| ● Continually track/record frequency information and friendly force data as received | New updates have been received from lower command levels concerning frequency restrictions. Two more frequency allotments are created for the remaining mission areas which incorporate the received restrictions. |
| ● Exchange information with Division CMS; forwarding restricted frequency data and receiving curent HF and VHF allotments | The Division CMS provides another database with defined allotments. These allotments are necessary because of other non-communications RF emitters from friendly forces in the area. These new allotments are merged into the Bde CMS reference plan. The CMS operator combines the new allotments with the existing three allotments using only the frequencies in common. To perform this function, the operator uses the reporting facility, finds all frequencies in common, and then modifies the existing allotments by the edit function. |
| ● Gather information on civilian emitters | Known civilian emitters are entered into the allotments as frequency restrictions. |
| ● Gather/track information on enemy jammers | Known or anticipated enemy jammers are entered into the allotments as frequency restrictions. |
| CNR NETWORK PLANNING INITIATED | |
| ● Overlay the combat nets on map backgrounds | |
| ● Determine and record net members/ equipment, net type (voice or data), name, mode of operation (single channel or frequency hopping), and the NCS for each net | The CMS operator decides to start the initial plan. The reference plan is copied and re-identified. Many of the members and nets will have already been entered and have been identified due to the reference plan. However, some changes are being made due to the current mission. Tasking organization changes are incorporated by deleting members from some nets and adding them to others. The members are graphically moved on screen to more closely correspond to their spatial relationships to one another. As many of the nets are defined, the operator assigns one of the three frequency allotments based on their planned region of operation. |
| ● On map showing high points, tentatively locate all VHF retransmission members | |
| ● Perform line-of-sight signal assessment | |
| ● Modify retransmission sites as required | The CMS operator identifies some members as re-transmission sites. This information will later be used during CI generation and assignment. |
| ALLOT VHF FREQUENCIES TO NETS | |
| ● Generate FH hopsets and lockouts | The CMS operator assigns the remaining unassigned nets to one of the three frequency allotments and then selects Generate to generate the VHF frequency CI. This process generates the frequency data used by the radio including hopsets, lockouts, cue frequencies, single-channel (SC) frequencies, and Net IDs. The |

| PHASE/ACTIVITIES | CMS OPERATION |
| --- | --- |
| | Cue frequencies are unique for each net and randomly selected from the allotment. The Net IDs are also unique to each net. Thus, for the 200 VHF nets, each net will use one of three common hopset/lockout sets but will have unique Cue frequencies and Net IDs. |
| ● Assess VHF frequency confliction and interference | The CMS operator knows that some members with VHF radios are physically close to another. For each known case, the operator selects Analysis to perform a VHF cosite check. The CMS terminal indicates that there may be a problem given the distance, antenna types, and operating power levels. For these two radio nets, the CMS operator decides to use just a portion of the allotments in order to de-conflict the frequencies. CMS automatically generates the new hopsets for these nets. The operator has the option of re-selecting cosite checks to determine if a problem still exists. |
| ASSIGN HF NET FREQUENCIES | |
| ● Determine HF frequencies allotments based on Sounder or modeling data | |
| ● Assign frequencies to nets | The operator creates three HF allotments based upon analysis predicting usable frequencies at certain times of day. Known frequency restrictions are also incorporated at this time. The operator selects to automatically generate the HF communications data. |
| ● Assess HF frequency confliction and interference; re-plan as required | |
| DEVELOP CRYPTO-PLAN FOR VHF/HF | |
| ● Generate and assign Keys | The operator makes a selection to automatically generate the crypto data for the HF and VHF radios. This is based on the net needlines and members. Both tags and keys are generated concurrently. |
| DEVELOP DISTRIBUTION PLAN | |
| ● Fill connectivity | CMS automatically determines a default fill connectivity for distribution of the CI. For certain cases in the current plan, the default connectivity is not possible due to geographic limitations. The operator decides to modify the connectivity to take these changes into account. |
| ● Fill routing | Based on the fill connectivity, CMS automatically determines what information is needed in each fill device, what fill device receives CI from other fill devices, and what radios each fill device is responsible for filling. |
| PREPARE AND DISTRIBUTE BRIGADE INFORMATION | |
| ● Prepare VHF and HF net diagrams and reports | The CMS operator prints out diagrams and reports for the plan to support administration and management. |
| ● Download data to Brigade fill devices | The fill devices from the Brigade NCSs connect to CMS and receive their downloaded data to support further distribution of the CI down their hierarchy chain. |
| DISTRIBUTION COMMENCES THROUGHOUT DIVISION WHILE IN GARRISON | |
| ● Brigade fill devices fill Battalion fill devices; Battalion fill devices fill Company fill devices | While in garrison, the Bde fill devices fill the Battalion (Btn) fill devices which in turn fill Co fill devices. |
| ● All fill devices fill their planned radios | The fill device display shows the operators the radios they are responsible for filling. |
| FORCES DEPLOY; NETWORKS IN-PLACE and COMMUNICATING | |
| ● Continual backups | While the mission progresses, the CMS operator follows Standard Operating Procedures (SOP) of performing a data backup once every 2 hours. |
| ● Reports of frequency conflicts | Units of friendly forces move into the immediate area of operations. These units are using older |

| PHASE/ACTIVITIES | CMS OPERATION |
| --- | --- |
| | single-channel radios which are being interfered with by single channel communications operating in the same band. |
| ● Frequency re-engineering and re-distribution | The CMS operator identifies and re-assigns the conflicting SC frequencies. CMS indicates which nets must change and the CI distribution is planned for these nets. The higher command level fill devices receive the new FH information and load their respective radios. Electronic Remote Fill (ERF) is performed to update all the affected radios with the new information. |
| ● Planning facility relocates | The CMS operator performs another backup and this data is physically transferred to the adjacent Brigade planning facility. There, it is used to bring up the alternative CMS platform to provide continuity of support while the current facility moves. The CMS terminal is not brought down until verification is received that the alternate CMS is operational.<br>The facility relocates over a span of 12 hours and the CMS terminal becomes operational at the end of that time. During this period, a number of changes were required to be made by the alternate CMS. This data is provided to the relocated facility. The currently held plan is marked as obsolete and the updated plan is then used. |
| ● Reports of force overrun-units compromised | Another report comes in indicating that contact has been lost with one of the squads and that they are feared captured. The CI data therefore is suspected of being compromised. |
| ● Compromise recovery planning and re-distribution | The CMS operator indicates that these members are compromised and CMS reports all the members holding the compromised CI. A replacement plan is recommended and the CMS operator accepts it. Distribution commences in order to provide the replacement information to the members holding the compromised CI. |
| ● After 10 days the CVs in use expire and require supersession | On day 7, the CMS operator notes that the current CVs will expire in three days. The operator makes a selection to supersede those CVs which automatically generates the appropriate updated CVs. These are downloaded through the fill device hierarchy chain, loaded into the NCS radios, and distributed to the other net radios via remote radio links. |

It will be understood that the embodiments described herein are merely exemplary of the principles of the invention, and that a person skilled in the art may make many variations and modifications without departing from the spirit and the scope of the invention. All such variations and modifications are intended to be included with the scope of the invention as defined in the appended claims.

We claim:

1. A Communications Management System architecture for carrying out planning/management functions for a communications system including a plurality of wireless communications devices arranged into at least one network, said architecture being distributed between a computer processor and a means for loading Communications Information ("CI") developed according to said architecture into said communications devices, and being comprised of:

means for generation and management of frequency assignment for said communications devices;

means for generation and management of security keys associated with said communications devices, wherein said security keys provide a means for encoding and decoding communications among said communications devices;

means for carrying out network planning and management in respect to an arrangement of said communications devices into said at least one network, said means for carrying out network planning and management includes means for establishing and modifying said at least one network;

means for planning and management of a distribution of assets comprising said communications system; and means for generation and management of said CI.

2. The Communications Management System architecture of claim 1 wherein said means for carrying out network planning and management includes means for storing a plurality of reference communications plans and for retrieving at least one of said stored reference plans.

3. The Communications Management System architecture of claim 2 wherein said means for carrying out network planning and management further includes means for modifying said retrieved plan in accordance with a desired communications operational objective.

4. The Communications Management System architecture of claim 2 wherein said means for carrying out network planning and management further includes means for merging data from at least two of said reference plans to create a new communications plan.

5. The Communications Management System architecture of claim 1 wherein said means for carrying out network planning and management further includes means for designation and communication with a Net Control Station for each network comprising said communications system.

6. The Communications Management System architecture of claim 1 wherein said means for planning and management of a distribution of assets includes means for establishing members of each network comprising said communications system, each said member comprising a grouping of equipment including said communications devices and said means for loading Communications Information.

7. The Communications Management System architecture of claim 6 wherein said means for planning and management of a distribution of assets further includes means for establishing said equipment.

8. The Communications Management System architecture of claim 1 further including purge means for deleting all of said Communications Information, whereby a purge process carried out by said purge means, once invoked, is irreversible.

9. The Communications Management System architecture of claim 1 wherein said means for generation and management of frequency assignment enables an operator to automatically generate frequency assignments for said communications devices based on known frequency allocations and restrictions applicable to an operating environment for said communications system.

10. The Communications Management System architecture of claim 1 wherein said means for generation and management of frequency assignment enables an operator to automatically generate frequency hopsets for communications devices included in said communications system operating in a frequency-hopping spread-spectrum transmission mode.

11. The Communications Management System architecture of claim 1 wherein said means for generation and management of CI operates to automatically establish appropriate CI for each network comprising said communications system.

12. The Communications Management System architecture of claim 11 wherein said means for generation and management of CI operates to automatically maintain correct CI relationships for each member of each said net as changes in said CI occur.

13. The Communications Management System architecture of claim 11 wherein said means for generation and management of CI operates to manage a distribution of CI to said means for loading Communications Information and from said means for loading to said communications devices.

14. The Communications Management System architecture of claim 1 wherein said means for generation and management of security keys operates to automatically assign crypto-keys and associated tags to all members of each network comprising said communications system, each said member comprising a grouping of equipment.

15. The Communications Management System architecture of claim 14 wherein said means for generation and management of security keys operates to automatically maintain supersession key/tag pairs and to provide notice to an operator of a time limit for replacement of key/tag pairs with said supersession pairs.

16. The Communications Management System architecture of claim 1 further including analysis means for determining cosite interference between geographically proximate communications devices.

17. The Communications Management System architecture of claim 16 wherein said analysis means further operates to determine new operating frequencies as required for said geographically proximate communications devices to avoid said cosite interference.

18. The Communications Management System architecture of claim 1 further including compromise recovery means which operates to determine a magnitude of a compromise occurring in respect to one or more communications devices and to automatically generate a report for an operator identifying all impacted portions of said communications system.

19. The Communications Management System architecture of claim 18 wherein said compromise recovery means further includes means for generation of new CI to portions of said communications system having compromised CI.

20. A system for managing communications among a plurality of users, said users being equipped with a plurality of radio transmitter/receivers (hereafter "radios") and being arranged for intercommunication among such users into at least one network, said system comprising:

a computer processor and an associated storage means;

means for entering data into said storage means related to said radios, wherein said radio data will be subject to processing by said processing means;

means for establishing a set of allowed frequencies for communication among said radios, and storing said allowed frequencies in said storage means;

means for causing said computer processor to generate at least one code set for encoding communications among said radios;

means for transmitting said frequency information and said code set information to said radios;

means for dynamically changing at least a portion of said frequency information and/or said code set information for at least two of said radios in response to changed conditions respecting operation of said at least two radios; and planning means for receiving data related to a desired communications operation and operating on such data to develop a communications mission plan for carrying out said desired operation.

21. The communications management system of claim 20 further including compromise recovery means for determining impacted portions of said plurality of radios in the event of a compromise of one or more of said radios and for generating a recovery plan to reestablish secured communications with at least a part of said impacted portion.

22. A method for managing communications among a plurality of users, said users being equipped with a plurality of radio transmitter/receivers (hereafter "radios") and being arranged for intercommunication among such users into at least one network, said method comprising:

entering data into a storage means related to said radios;

establishing a set of allowed frequencies for communication among said radios, and storing said allowed frequencies in said related storage means;

causing at least one code set for encoding communications among said radios to be generated;

transmitting said frequency information and said code set information to said radios;

dynamically changing at least a portion of said frequency information and/or said code set information for at least two of said radios in response to changed conditions respecting operation of said at least two radios; and receiving data related to a desired communications operation and operating on such data to develop a communications mission plan for carrying out said desired operation.

23. The communications management method of claim 22 further including the step of establishing a compromise recover process for determining impacted portions of said plurality of radios in the event of a compromise of one or more of said radios and for generating a recovery plan to reestablish secured communications with a at least a part of said impacted portion.

* * * * *